Aug. 25, 1953   F. S. CHOPIESKA   2,649,882
CUTTING KNIFE FOR FOOD CHOPPERS
Filed Aug. 16, 1949

INVENTOR.
FRANK S. CHOPIESKA
BY Arthur O. Andersen
atty.

Patented Aug. 25, 1953

2,649,882

UNITED STATES PATENT OFFICE 2,649,882

CUTTING KNIFE FOR FOOD CHOPPERS

Frank Stephan Chopieska, La Crosse, Wis.

Application August 16, 1949, Serial No. 110,601

1 Claim. (Cl. 146—189)

This invention relates to a knife and more particularly to a meat cutting knife which comprises a blade support and inserted blades.

It is old in the prior art to secure inserted blades in a blade support by means of set screws. However such prior art knives have the disadvantage that the set screws become rusted to the blade support and removal of the blades is very difficult. The prior art construction in which set screws are used has the further disadvantage that meat collects in and around the set screw and makes the knife unsanitary for repeated use.

It is an object of this invention to provide a knife which has a blade support and blades which are removably secured to the blade support for easy replacement.

It is a further object of this invention to provide a knife which requires no tools for securing or removing the blades from the blade support.

Further objects will become apparent as the specification proceeds to describe the invention with reference to the drawings in which.

Figure 1:
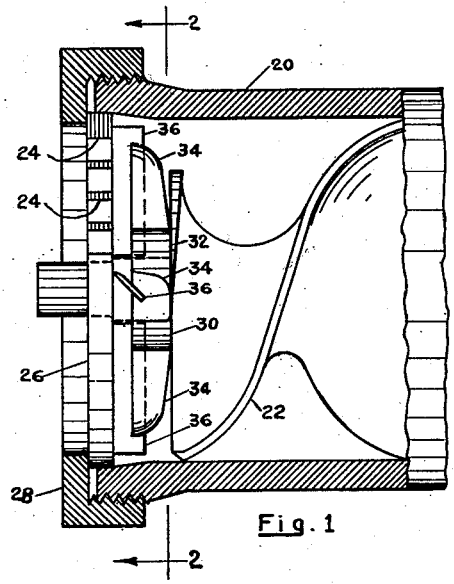
Fig. 1 is a fragmentary front view partly in section of a meat grinder with the knife in working position.
Figure 2:
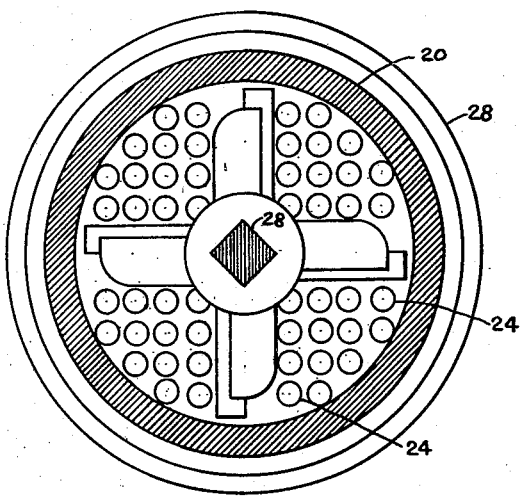
Fig. 2 is a sectional view taken on line 2—2 of Fig. 1.

Referring now to the drawings and especially to Figs. 1 and 2, the reference numeral 20 designates the bowl of a meat cutting machine in which is rotatably mounted a helical grooved conveying member 22 which when rotated feeds the meat into the holes 24 of the plate 26 which is held stationary in the open end of the bowl 20 by means of the screw threaded cap 28.

The outer end of the conveying member 22 has a reduced square portion 28 upon which the knife 30 is supported for rotation with the helically grooved conveying member 22. The knife has a blade support 32 having four arms 34 each of which supports a blade 36. The blades 36 bear against the inner surface of the plate 26 in such a manner that the meat passing through the holes of the plate is cut off by the blades when the conveying member 22 is rotated.

Figure 3:
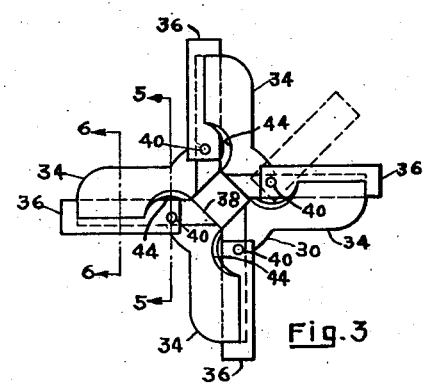
Fig. 3 is a front view of the knife of the invention.
Figures 4, 5, 6:
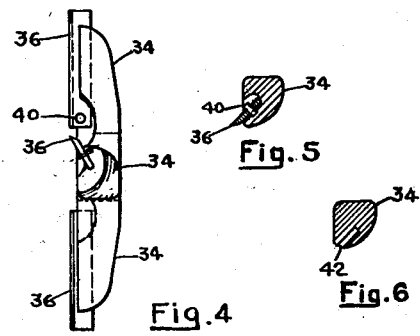
Fig. 4 is a side view of the knife.
Fig. 5 is a cross-sectional view taken on line 5—5 of Fig. 3.
Fig. 6 is a cross-sectional view taken on line 6—6 of Fig. 3.

Referring specifically to Figs. 3-5 inclusive, it will be observed that the blade support 30 has a centrally disposed square hole 38 for receiving the square portion 28 of conveying member 28. Fig. 4 is a side view of the knife showing how each arm 34 supports a blade 36.

Fig. 5 shows how the blade is mounted on a pin 40 which is driven into a hole in arm 36. Fig. 6 is a sectional view of an arm 34 showing the blade receiving slot 42 into which the blade is pivoted about the pin 40. The inner portion of each arm 34 has an arcuate recess 44 to provide clearance for the corner of the blade when it is pivoted into working position.

Figure 7:
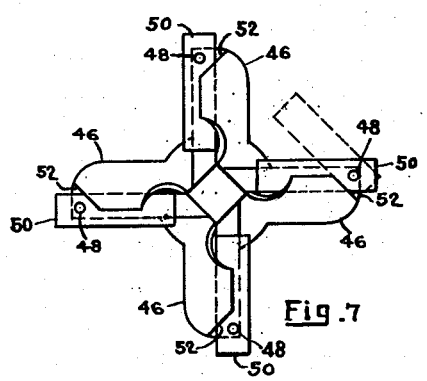
Fig. 7 is a side view of a modification of my invention.

Fig. 7 shows a modification of my invention in which each blade supporting arm 46 has blade supporting pin 48 at its outer end to receive a hole in the blade 50. Each arm has a beveled portion 52 on one side of the blade receiving slot to allow the blade to be placed on the pin 48 and then pivoted into working position.

Figures 8, 9:
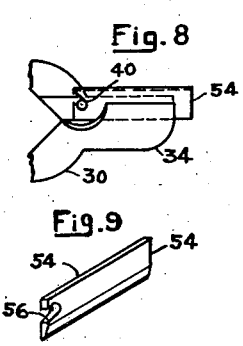
Fig. 8 is a fragmentary view of still another modification of my invention.
Fig. 9 is a perspective view of a blade of the knife of Fig. 7.
Figure 10:
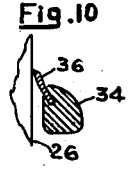
Fig. 10 is a cross-sectional view of one of the arms of the knife showing how the knife is flexed against the perforated disc of the meat grinder.

Fig. 8 shows another modification of the invention in which the blade support 30 is the same as the blade support of Figs. 1-5, but the blade 54 has an inclined slot 56 which engages the pin 40. The blade is placed in a position similar to the dotted line position of Fig. 3 and the blade is then pivoted into working position so that the blade is supported on both sides and its edge by the slot in the arms 34.

The blades 36 of my invention are made of hardened steel and they flex or bend slightly when they engage the plate 26. Fig. 9 shows on an exaggerated scale how the blade 36 is flexed. The ability of the blade to flex provides good contact between the blade 36 and the plate 26 and also accomplishes self sharpening of the blade 36 by movement over the plate 26.

While I have shown and described specific embodiments of my invention, various changes are possible without departing from the scope of the invention, and I desire to be limited only by the claim.

I claim:

A knife for a food chopper comprising a blade holder having a hub and a plurality of arms extending substantially radially from said hub, said arms having grooves therein extending longitudinally with respect to said arms, said grooves having substantially planar substantially parallel sides, said hub having surfaces coplanar with the sides of said grooves, pins fixedly secured to said blade holder and extending from said surfaces, arcuate recesses in said hub substantially concentric with said pins, and substantially rectangular sheet metal blades mounted in said grooves and having apertures into which said pins project, said arcuate recesses extending from the outer surface of said hub to the surfaces of said hub which are coplanar with the sides of said grooves to provide unobstructed spaces to allow placing blades on the pins and turning them into position in said grooves without interference between the blades and the hub.

FRANK STEPHAN CHOPIESKA.

References Cited in the file of this patent

UNITED STATES PATENTS

| Number | Name | Date |
| --- | --- | --- |
| 1,375,501 | Ganzhorn | Apr. 19, 1921 |
| 2,206,529 | Dieckmann | July 2, 1940 |
| 2,259,623 | Dieckmann | Oct. 21, 1941 |
| 2,431,267 | May | Nov. 18, 1947 |

FOREIGN PATENTS

| Number | Country | Date |
| --- | --- | --- |
| 124,413 | Germany | Oct. 22, 1901 |
| 587,177 | Germany | Oct. 31, 1933 |
| 432,417 | Great Britain | July 2, 1935 |